(No Model.)
H. S. SHARPE.
MUSIC BOARD.
No. 493,126. Patented Mar. 7, 1893.
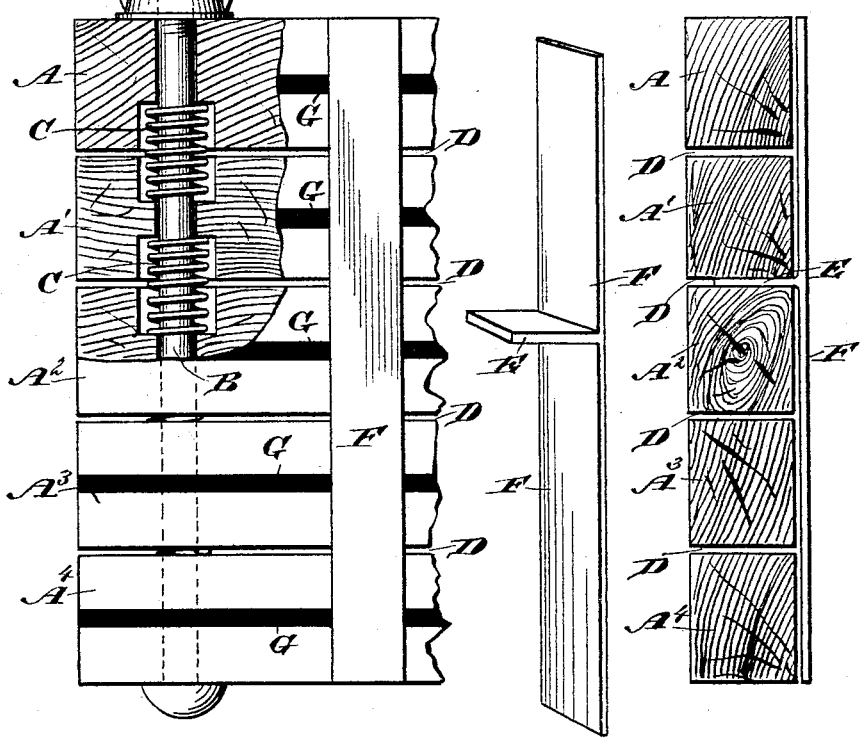
WITNESSES:
INVENTOR
H. S. Sharpe
BY Munn & Co
ATTORNEYS.

UNITED STATES PATENT OFFICE.

HARRY S. SHARPE, OF SEATTLE, WASHINGTON.

MUSIC-BOARD.

SPECIFICATION forming part of Letters Patent No. 493,126, dated March 7, 1893.

Application filed August 9, 1892. Serial No. 442,551. (No model.)

*To all whom it may concern:*

Be it known that I, HARRY S. SHARPE, of Seattle, in the county of King and State of Washington, have invented a new and Improved Music-Board, of which the following is a full, clear, and exact description.

The invention relates to educational appliances, and its object is to provide a new and improved board for conveniently teaching music, which is simple and durable in construction, and arranged to permit of readily inserting or removing music characters.

The invention consists of a series of connected bars provided with notation lines, and music characters each provided with a rearwardly-extending lug adapted to be inserted between two adjacent bars to hold the character in the proper position relative to the notation lines.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a face view of the improvement. Fig. 2 is an enlarged face view of part of the improvement with parts in section. Fig. 3 is a transverse section of the same; and Fig. 4 is a perspective view of one of the music characters.

The improved board is composed of a series of bars A, A', A², A³ and A⁴, connected with each other near their ends by bolts B, so that the bars are arranged one above the other, as will be readily understood by reference to the drawings. The several bars are held suitable distances apart by means of springs C, preferably coiled on the bolts B and inserted in suitable recesses formed in the different bars, as illustrated in Fig. 2. The springs C hold the adjacent bars a sufficient distance apart to form a space D for the insertion of a lug E formed on the rear of a music character F, made of sheet metal, card-board, or other suitable material.

Each of the bars A, A', A², A³ and A⁴ is formed on the front with a notation line G, so that the several bars represent the usual five notation lines on which music is written.

The device is used as follows: When the several bars are in position on the bolts B and pressed apart by the springs C, then the music characters F can be supported in the front of the board at the desired place by inserting the lug E of the respective music character in the space D between the adjacent bars, so as to support the music character in the proper place on the front of the board, as will be readily understood by reference to Fig. 1. In teaching music a pupil, for instance, will be told to set up a line of music on the board in the manner above described, the several characters being placed on the board between or on the proper notation lines, and after the entire line of music characters has been set up the nuts of the bolts B are screwed up so as to securely fasten the lugs E of the different music characters in place, thus securely holding the characters in place on the board.

By loosening the nuts of the bolts the music characters can be removed and others inserted to form the different lines of music.

Having thus fully described my invention, I claim as new and desire to secure by Letters Patent—

1. A music board comprising a series of connected bars provided with notation lines, and music characters each provided with a rearwardly extending lug adapted to be inserted between two adjacent bars to hold the character in the proper position relative to the notation lines, substantially as shown and described.

2. A music board comprising a series of bars located one above the other, bolts for holding the bars together, and springs for pressing the bars apart to form spaces between two adjacent bars, substantially as shown and described.

3. A music board comprising a series of bars located one above the other, bolts for holding the bars together, springs for pressing the bars apart to form spaces between two adjacent bars, and music characters each provided on its rear with a lug adapted to be inserted between adjacent bars, substantially as shown and described.

HARRY S. SHARPE.

Witnesses:
ROLLA L. DURANT,
FRANK E. ROWE.